United States Patent
Zhai et al.

(10) Patent No.: US 8,582,032 B2
(45) Date of Patent: Nov. 12, 2013

(54) MOTION DETECTION FOR INTERLACED VIDEO

(75) Inventors: Fan Zhai, Richardson, TX (US); Weider Peter Chang, Hurst, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1614 days.

(21) Appl. No.: 11/852,215

(22) Filed: Sep. 7, 2007

(65) Prior Publication Data

US 2008/0062309 A1  Mar. 13, 2008

Related U.S. Application Data

(60) Provisional application No. 60/824,790, filed on Sep. 7, 2006.

(51) Int. Cl.
| H04N 7/01 | (2006.01) |
| H04N 11/20 | (2006.01) |
| H04N 9/78 | (2006.01) |
| H04N 5/14 | (2006.01) |
| H04N 9/64 | (2006.01) |

(52) U.S. Cl.
USPC ........... 348/452; 348/667; 348/668; 348/669; 348/700

(58) Field of Classification Search
USPC .......................................... 348/448, 452, 700
See application file for complete search history.

(56) References Cited

U.S. PATENT DOCUMENTS

| 5,475,438 | A | * | 12/1995 | Bretl | 348/452 |
| 6,335,990 | B1 | * | 1/2002 | Chen et al. | 382/261 |
| 6,647,062 | B2 | * | 11/2003 | Mackinnon | 375/240.16 |
| 6,859,237 | B2 | * | 2/2005 | Swartz | 348/700 |
| 7,405,766 | B1 | * | 7/2008 | Chou et al. | 348/448 |
| 7,468,756 | B2 | * | 12/2008 | Wyman | 348/558 |
| 7,542,095 | B2 | * | 6/2009 | Zhou et al. | 348/452 |
| 7,605,866 | B2 | * | 10/2009 | Conklin | 348/448 |
| 2004/0179108 | A1 | * | 9/2004 | Sorek et al. | 348/216.1 |
| 2005/0078854 | A1 | * | 4/2005 | Shikano et al. | 382/103 |
| 2005/0253963 | A1 | * | 11/2005 | Wong | 348/452 |
| 2006/0093228 | A1 | * | 5/2006 | Loukianov et al. | 382/236 |
| 2007/0188662 | A1 | * | 8/2007 | Winger et al. | 348/701 |

* cited by examiner

*Primary Examiner* — Mushfikh Alam
(74) *Attorney, Agent, or Firm* — Mirna Abyad; W. James Brady; Frederick J. Telecky, Jr.

(57) ABSTRACT

Motion detection in interlaced video fields, as useful in de-interlacing, includes spatial-temporal maximum filtering, temporal IIR filtering dependent upon spatial-temporal variance, and spatial variance dependent moving-still interpolation blending factor.

13 Claims, 12 Drawing Sheets

FIELD n-1
var_pre(j,i,n-1)

FIELD n
var_cur(j,i,n)

FIELD n-1

FIELD n

MOTION DETECTION FOR INTERLACED VIDEO

CROSS-REFERENCE TO RELATED APPLICATIONS

This application claims priority from and incorporates by reference provisional application No. 60/824,790, filed on Sep. 7, 2006. The following co-assigned copending patent application discloses related subject matter: application Ser. No. 11/550,100, filed Oct. 17, 2006.

BACKGROUND

The present invention relates to digital video signal processing, and more particularly to interlace-to-progressive conversion.

For moving picture systems, interlaced video format is widely used to reduce data rate. That is, each image frame consists of two fields, each of which contains samples of either the even numbered (top field) or the odd numbered (bottom field) lines of the image. In interlaced scan, fields are scanned and displayed sequentially, as shown for a 5×5 block of pixels in FIG. 5A. By taking advantage of the time it takes for an image to fade on a CRT, interlaced video gives the impression of double the actual refresh rate, helping to prevent flicker, which occurs when the monitor's CRT is driven at a low refresh rate, and allowing the screen's phosphors to lose their excitation between sweeps of the electron gun. Interlaced scan achieves a good tradeoff between frame rate and transmission bandwidth requirements. For example, NTSC interlaced television sets display 60 fields per second.

However, for a video display that can support a refresh rate high enough so that flicker is not perceivable, progressive scanning is preferable, since interlacing reduces the vertical display resolution and causes twitter effects for pictures with high vertical frequency. In progressive scan, all the frames, as a whole, are scanned and displayed continuously, as shown in FIG. 5B.

Due to the increased popularity of progressive scanning applications such as in digital TV (DTV) and displaying TV on PC monitors, there is a need to display video on a progressive display. Thus, the function of converting interlaced video to progressive video, so called "de-interlacing," is strongly called for. The task for de-interlacing is to convert the interlaced frames into progressive frames, which represent the same image as the corresponding input field but contain the samples of the missing lines as well. This process is illustrated in FIG. 5C, where the dash lines show the missing lines in the interlaced video.

Mathematically, for a given interlaced input $F(j,i,n)$, the output of de-interlacing, $F_o(j,i,n)$, can be defined as $$F_o(j, i, n) = \begin{cases} F(j, i, n), & \mod(j, 2) = \mod(n, 2) \\ \hat{F}(j, i, n), & \text{otherwise} \end{cases} \quad (1.1)$$

where j, i, and n are the vertical, horizontal, and temporal index, respectively, the pixel $F_o(j,i,n)$ is the result of de-interlacing, $\hat{F}(j,i,n)$ is the estimation of the missing lines generated by the de-interlacing method, and $F(j,i,n)$ is the pixel from the original interlaced field. The existing, even or odd, lines in the original fields are directly transferred to the output frame.

There are various ways to calculate the missing pixel $\hat{F}(j,i,n)$. Generally, de-interlacing methods can be classified into five categories: (1) spatial (intra-frame) techniques; (2) temporal (inter-frame) techniques; (3) spatial-temporal techniques; (4) motion detection-based techniques, and (5) motion-compensated techniques.

The traditional spatial, temporal, and spatial-temporal interpolation schemes usually lead to poor conversion performance. The spatial interpolation does not fully utilize the achievable vertical-temporal (V-T) bandwidth in filtering because it ignores the temporal spectrum, which reduces the vertical resolution. The temporal interpolation, however, causes artifacts such as jaggy and feather effects when motion is present. Although the spatial-temporal interpolation can fully utilize the V-T spectrum, it cannot handle motion scenes well.

Thus motion adaptive techniques are generally advantageous. The most advanced de-interlacing techniques usually make use of motion estimation and compensation. Motion compensation allows virtual conversion of a moving sequence into a stationary one by interpolating along the motion trajectory. However, this type of technique is of much higher complexity in implementation. Another type of motion-adaptive de-interlacing schemes is based on motion detection. In the following, we use the terminology "motion-adaptive de-interlacing" to refer to motion-detection based de-interlacing. As is well-known, interlaced sequences can be essentially perfectly reconstructed by temporal filtering in the absence of motion, while spatial filtering performs well in the presence of motion. Motion-detection based methods use a motion detector to take advantage of these facts by classifying each pixel into moving and stationary regions. Based on the output of the motion detector, the de-interlacing method then fades between the temporal filtered output and the spatial filtered output. In addition to fading between spatial and temporal output, spatial-temporal filtering can be employed when motion is present but relatively insignificant.

In motion-adaptive de-interlacing, motion detection is a key component, as the de-interlacing performance for a video with motion is primarily determined by it. It can be generally presented as in equation (1.2), where is a real number between 0 and 1 representing a motion detection parameter that indicates the likelihood of motion for a given pixel.

$$\hat{F}(x,y,n) = \alpha F_{mot}(x,y,n) + (1-\alpha) F_{stat}(x,y,n) \quad (1.2)$$

The pixels $F_{stat}(x, y, n)$ are calculated for stationary regions using a temporal filtering, and the pixels $F_{mot}(x, y, n)$ are calculated for moving regions using a spatial filtering. FIG. 5D illustrates the essential idea.

The general structure of a motion detector is shown in FIG. 5E. Motion image is created by taking the difference between the current field and the field of one frame ago. The motion image is first sent through a low-pass filter (LPF), followed by a rectifier. This filter filters out the noise, therefore reducing "nervousness" near edges in the event of timing jitter. Then another low pass filter is employed to improve the consistency of the motion detection relying on the assumption that objects are usually large compared to a pixel. This is usually a spatial or spatial-temporal maximum filter. Lastly, the nonlinear but monotonic transfer function translates the signal into, which indicates the likelihood of motion for each pixel. The larger amount of motion, the greater value of Apart from the general structure of the motion detector, low pass filters are not necessarily linear. In addition, more than one detector can be used. Working on more than just two fields in the neighborhood of the current field with a logical or linear combination of their outputs may lead to a more reliable indication of motion. Next, we briefly describe the known motion detection techniques used for de-interlacing.

The goal of motion detection is to detect changes for each pixel in a video sequence from one field to the next. This task is straightforward for a progressive sequence by directly taking the frame difference. However, it is impossible to take the frame difference for interlaced sequences because pixels from consecutive fields do not have the same spatial locations. Thus consider some of the proposed solutions for motion detection in interlaced sequences.

Two-Field Motion Detection

Since motion detection is straightforward for progressive sequences, it would be an intuitive way to first convert the fields to frames, using any deinterlacing method. Any spatial de-interlacing method can be used for this purpose, such as line repetition, linear interpolation, or the edge-adaptive interpolation method. The idea is illustrated in FIG. 5F.

In FIG. 5F the pixel marked with 'X' is the currently processed pixel, which is first estimated by a spatial deinterlacing method. The absolute difference, which denotes the motion for the pixel currently being processed, is computed between the estimate and the pixel from the previous field. This pixel difference is represented in FIG. 5F by the double arrow symbol.

A more theoretical approach to this problem is to use a phase-correction filter applied spatially to obtain the estimate of the current pixel. One suggested phase-correction filter is a 6-tap filter with coefficients (3, −21, 147, 147, −21, 3) after quantization into 8-bit integers, as shown in FIG. 5F. After the phase correction filtering, the obtained estimate is compared with the pixel of the previous field to determine the corresponding motion. Please note that here the phase-correction filtering actually plays a dual role, i.e., it is used for both motion detection/-compensation and interpolation for de-interlacing, which makes the overall method computationally efficient. This method needs only two fields storage plus seven line buffers. The problem arising from two-field motion detection is that, without perfect reconstruction, there will be some errors inherent in the interpolation step. These errors can make vertical details in the picture appear as moving even if it is static. For instance, the pixels above and below pixel 'X' in FIG. 5F do not necessarily have any correlation to the actual value of pixel 'X'. Thus, the interpolation may be done incorrectly and the resultant absolute difference between the interpolated pixel and its corresponding pixel in the previous field will not be an appropriate measure of motion. This error leads to a significant number of false-detections. As a result, more regions of the video sequence will be de-interlaced spatially than necessary, resulting in lower quality.

Three-Field Motion Detection

The drawback of two-field motion detection is due to the interpolation, which is not accurate. Three-field motion detection is, therefore, the simplest way to overcome such drawback by only comparing pixels on identical scan lines.

As shown in FIG. 5G, this technique is similar to FIG. 5F, except that no interpolation is needed. In a three-field motion detection scheme, the pixel in the previous field is compared to the pixel at the same position in the next field. Since only pixels on the scan lines are calculated, the absolute difference can be computed without any interpolation. An absolute difference of these two pixels is computed as an indication of the likelihood of motion of the current pixel that is being processed.

While two-field motion detection results in many false positives (detection of motion when none is present), three-field motion detection results in many false negatives (failure to detect when motion is actually present) because it is unable to detect fast-moving regions. The artifacts caused by missed detection are similar to those caused by field repetition.

Four-Field Motion Detection

The mis-detection caused by two- and three-field methods is the insufficient detection of information due to only one set of comparisons. Four-field motion detector improves upon them by comparing three sets of pixels rather than only one set of pixels in the previous two methods. The additional two pixel differences help to protect against errors in static edge region caused by two-field motion detection and errors in fast motion region caused by three-field motion detection scheme. The operation is illustrated in FIG. 5 H.

Three absolute differences are computed as shown in FIG. 5H. This results in a better decision of fast motion. Only pixels on corresponding scan lines are compared, thus no interpolation is needed. The output of this motion detector is the maximum of the three pixel differences.

$$A=|F(x,y,n-1)-F(x,y,n+1)|$$

$$B=|F(x,y-1,n)-F(x,y-1,n-2)|$$

$$C=|F(x,y+1,n)-F(x,y+1,n-2)|$$

$$P_d=\max(A,B,C) \quad (2.1)$$

While this method has better performance than three-field motion detection, it can still miss detections. The error usually happens when the motion detector designates a moving region as stationary. One example is when both the two odd neighboring fields and the two even fields are very similar to each other, while at the same time, the odd fields are quite different from the even fields. This will result in no motion detected, but the frame actually changes a lot.

Five-Field Motion Detection

The Grand Alliance, developers of the United States HDTV standard, suggested a five-field based motion detection method for HDTV format conversion. This method improves upon four-field motion detection by reducing the number of missed motion detections, but the tradeoff is that one more field storage is needed. The proposed method is illustrated in FIG. 5I.

$$A=|F(x,y,n-1)-F(x,y,n+1)|$$

$$B=|F(x,y-1,n)-F(x,y-1,n-2)|$$

$$C=|F(x,y+1,n)-F(x,y+1,n-2)|$$

$$D=|F(x,y-1,n)-F(x,y-1,n+2)|$$

$$E=|F(x,y+1,n)-F(x,y+1,n+2)|$$

And the motion detector outputs the maximum of the following combination of these five pixel differences as the indicator of the likelihood of motion.

$$P_d = \max\left\{A, \frac{B+C}{2}, \frac{D+E}{2}\right\} \quad (2.2)$$

In this maximum operation, the two pixel differences between the two even and odd fields are averaged. Therefore, no interpolation is needed in this method. Compared with the previous three methods, five fields are involved. Therefore, the advantage is that more motion coverage is used to improve the motion consistency.

This method has yet another advantage. The previous methods, except for the three-field motion detector, all detect motion in one direction of time. Particularly, they are all structured to detect differences between the current frame and the previous frames. Therefore, those methods all use the previous field for temporal de-interlacing. Nonetheless, the five-field method, to some extent, looks for motion in both the forward and backward directions. It is not immediately clear whether the previous field or the next field should be used for temporal interpolation in the motion adaptive deinterlacing method. Under that circumstance, as suggested by the Grand Alliance, a 4-tap VT median filter is thus used for temporal deinterlacing together with the five-field motion detection.

While this method does have the best performance of all the four methods discussed, it is still possible that some combination of frames can cause the motion detection method to miss areas of very fast and periodic motion. For example, a sequence of fields with some region that flickers between two images once every field over a five-field duration will cause such problems. These types of motion detection methods can only compare even fields with even fields or odd fields with odd fields. Consequently, the flickers at such frame rate cannot possibly be detected. The only type of motion detection that could detect this kind of flickers is a two-field based scheme, which has poor performance for the reasons mentioned previously in this section. A motion detection scheme similar to the current one but using seven fields or nine fields could be implemented to help improve the performance. The problem is that eventually it becomes unreasonable to look so far into the future or past. Additionally, the storage size requirement makes it impractical to do that.

Hybrid Methods

While motion adaptive methods do perform very well in general, it is still possible for a combination of frames to cause the motion detector's failure. Hybrid methods which combine motion detection with V-T median filter are proposed to improve this. A proposed seven-point median filter is defined by $$\hat{F}(x, y, n) = \text{median}\left(A, B, C, D, E, F, \alpha F(x, y, n-1), \beta \frac{B+E}{2}\right) \quad (2.3)$$

where α (unrelated to α of (1.2)) and β are the integer weights: αA indicates the number of A's that occur in the median list in (2.3); for example, 3A means A, A, A. A large value of α increases the probability of field repetition, whereas a large β increases the probability of line averaging at the output. And the definitions for pixels A, B, C, D, E, F, G and H are presented in FIG. 5J. The motion detector controls the weight of these individual pixels at the input of the median filter.

In another method, a three-level hierarchical motion detector classifies motion into three categories, static, slow and fast motion. Based on this classification, one of the three defined interpolators is selected. In the case of static images, a temporal FIR filter is used; in the case of slow motion, a so-called weighted hybrid median filter (WHMF) is selected as the interpolator; and in the case of fast motion, a spatial FIR filter is employed. The reconstructed pixel is therefore described by $$\hat{F}(x, y, n) = \begin{cases} (F(x, y, n-1) + F(x, y, n+1))/2 & (static) \\ \text{median}\{\alpha_0(A+F)/2, \alpha_1(B+E)/2, & (slowmotion) \\ \alpha_2(C+D)/2, \alpha_3(G+H)/2\} \\ \alpha_0 B + \alpha_1 E + \alpha_2 G + \alpha_3 H & (fastmotion) \end{cases} \quad (2.4)$$

The coefficients are calculated according to Webers law ("the eye is more sensitive to small luminance difference in dark areas than in bright areas") as below $$\beta_0 = \frac{A+F}{|A-F|}, \quad \beta_1 = \frac{B+E}{|B-E|}, \quad (2.5)$$
$$\beta_2 = \frac{C+D}{|C-D|}, \quad \beta_3 = \frac{G+H}{|G-H|}$$

and $\alpha_i = 2$, assuming $\beta_i$ is the minimum among the four β's and $\alpha_j = 1 \forall \neq i$.

As discussed above, the techniques of motion detection is a key component in de-interlacing system and each technique above has its weakness.

SUMMARY OF THE INVENTION

The present invention provides a motion detection method and system useful in motion-adaptive de-interlacing which includes a variance-adaptive temporal IIR filtering of a motion measure.

DESCRIPTION OF THE PREFERRED EMBODIMENTS

Figure 1A:
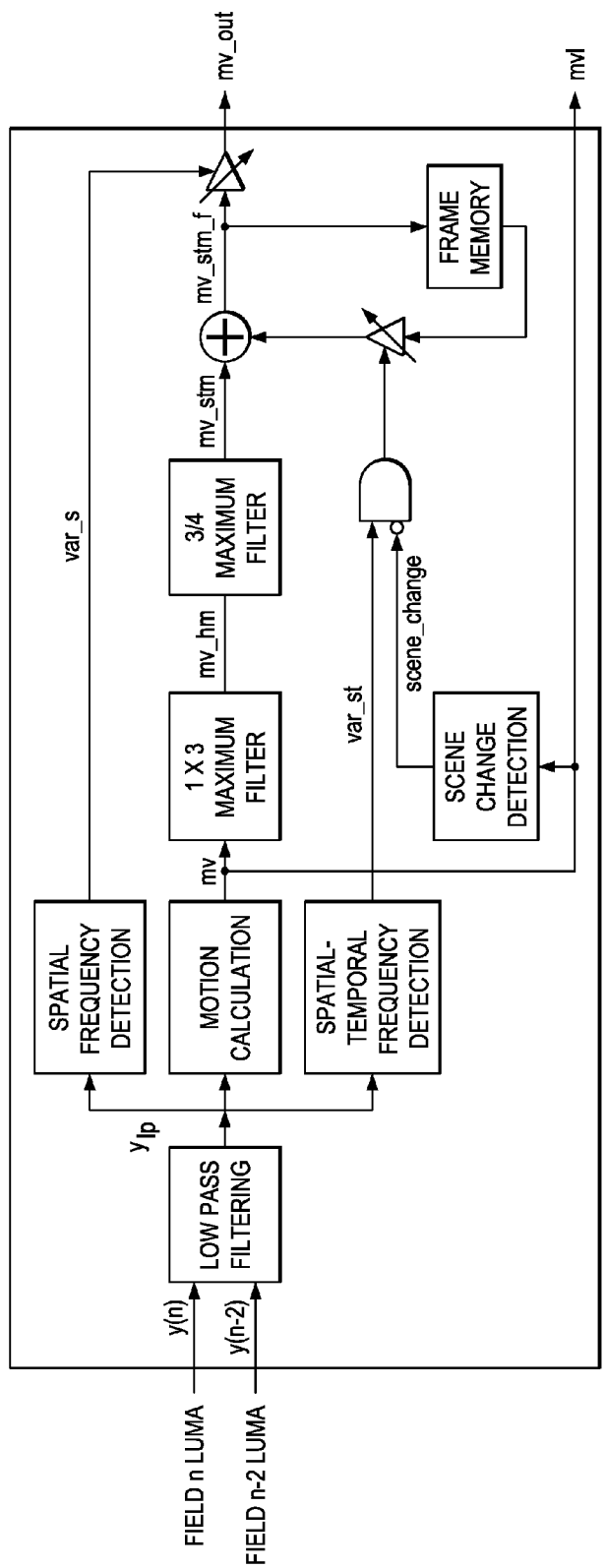
FIGS. 1A-1E show preferred embodiment systems and component operation.

The block diagram of a preferred embodiment motion detector is shown in FIG. 1A. The inputs to the system are luma signals (i.e., Y of YCbCr pixel color) from two neighboring fields with the same parity (two odd fields or two even fields). The outputs are the detected measures of motion ("mv" for motion value). Note that there are different versions of motion outputs, which can be used at different applications. For example, the output, mv1, can be used for temporal noise reduction applications, in which motion should only account for the difference of pixels from the two neighboring fields with the same parity. However, for the applications of de-interlacing, as discussed above, motion detection that only accounts for two fields very likely results in misdetection (false negative), and thus spatial and temporal maximum filtering is usually needed. The output, mv_out, can then serve for this purpose.

Preferred embodiment systems such as TV phones, PDAs, notebook computers, etc., perform preferred embodiment methods with any of several types of hardware: digital signal processors (DSPs), general purpose programmable processors, application specific circuits, or systems on a chip (SoC) such as combinations of a DSP and a RISC processor together with various specialized programmable accelerators. FIG. 1D is a block diagrams of an example processor with FIG. 1E more details of the display unit. A stored program in an onboard or external (flash EEP) ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks; e.g., the Internet.

Low-pass filtering is usually necessary to improve the noise robustness of the system. It can be performed in either the luma domain (low pass filtering is performed on the input luma and then differences of filtered luma are calculated as the motion values) or the motion value domain (motion value is first calculated by taking difference of luma values, and then the low-pass filtering is performed on the resulting motion values). This preferred embodiment employs the former approach, as shown in FIG. 1A. Motion calculator then calculates the amount of motion based on the differences of the filtered luma signals from two neighboring fields with the same parity. As previously discussed, in order to reliably detect motion especially fast motion for the purpose of de-interlacing, dilation is usually needed, which can be implemented in the form of maximum filtering. The motion values pass through a spatial maximum filter followed by a spatial-temporal maximum filter for further dilation. The use of a 1×3 spatial maximum filter together with a 3×1 (or 4×1) spatial-temporal maximum filter is equivalent to a 3×3 (or 4×3) spatial-temporal maximum filter. The reason to separate them is for the purpose of saving calculation, because this structure allows for storing the spatial maximum filtered output in a memory. In using this structure, when the spatial-temporal filtering is performed, we do not need to repeat the calculations of the motion values for the previous fields as they are already stored in the memory. In addition, this structure is flexible to support motion detection using different number of fields' motions. The tradeoff, of course, is that extra external memory is needed to store the spatial maximum filtered motion values.

As previously discussed, in order to handle fast motion, usually more than 5 fields' motions need to be included in the maximum filter. However, the use of more fields' data leads to the use of more memory. In order to overcome this, the preferred embodiments employ the technique of IIR filtering. The IIR filtering is performed on the motion outputs of the spatial-temporal maximum filter, mv_stm, as shown in FIG. 1A.

Figure 4:
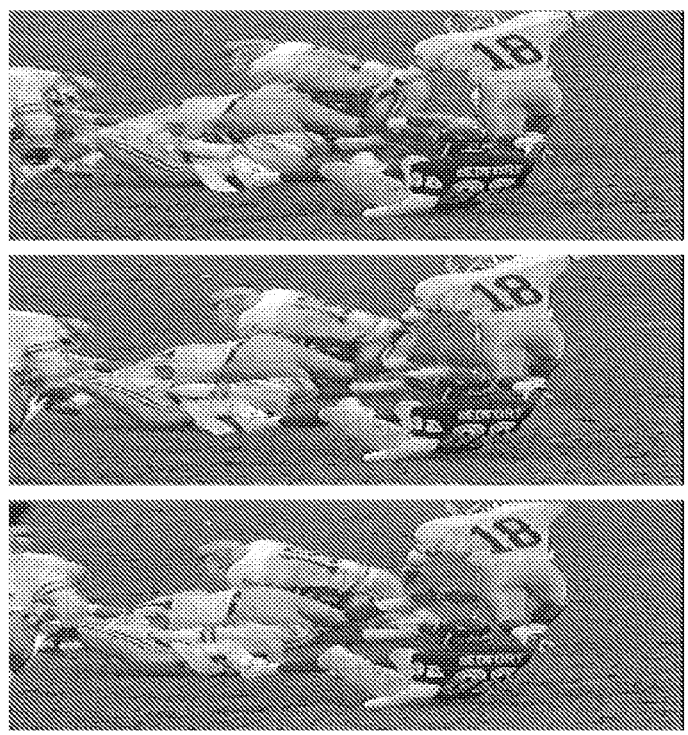
FIG. 4 illustrates motion in a video sequence.
Figure 5A:
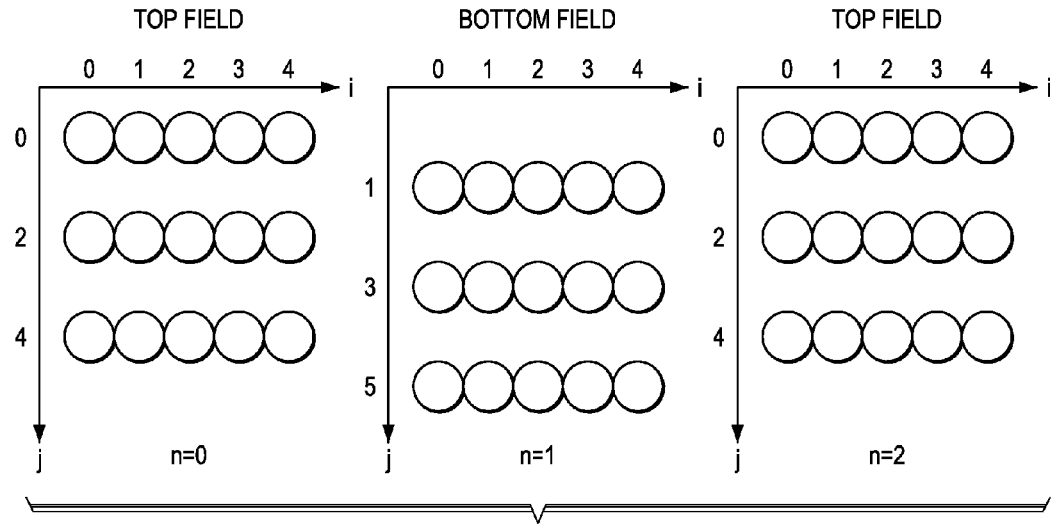
FIGS. 5A-5J show known field motion detection method pixel coverage.
Figure 5B:
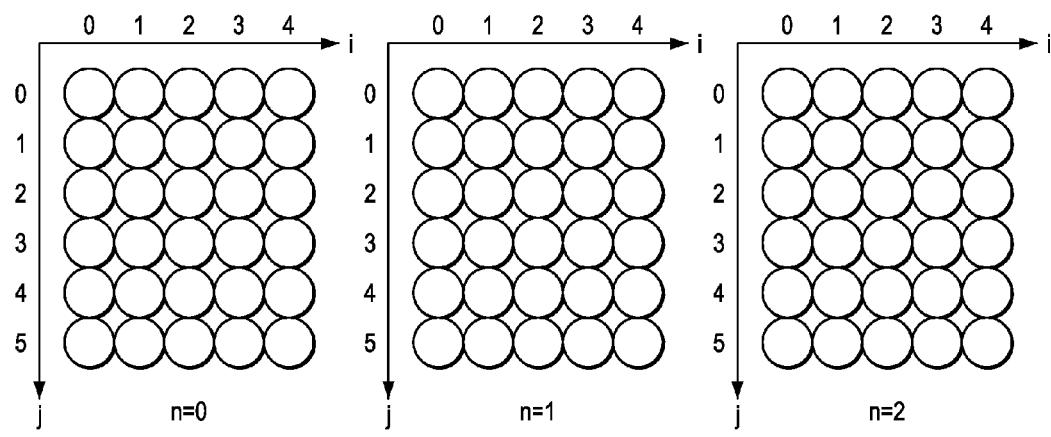
Figure 5C:
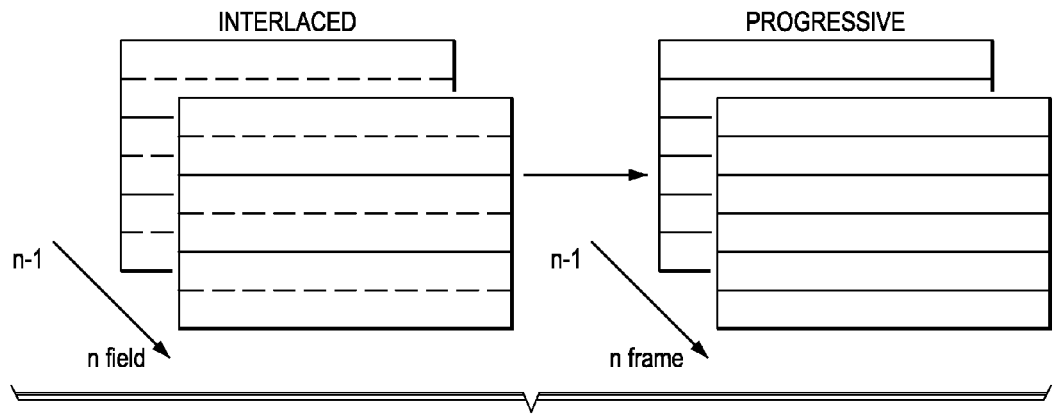
Figure 5D:
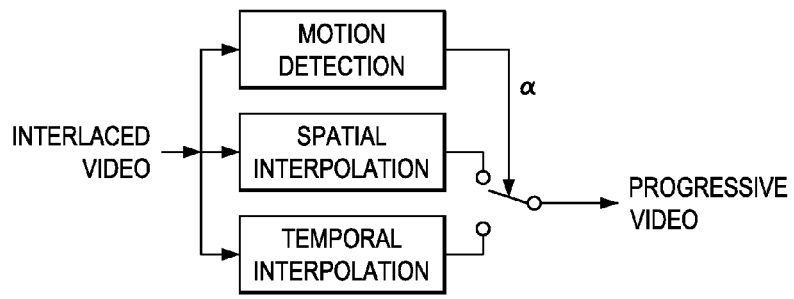
Figure 5E:
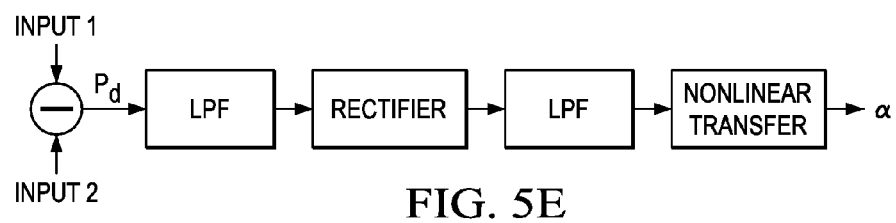
Figure 5F:
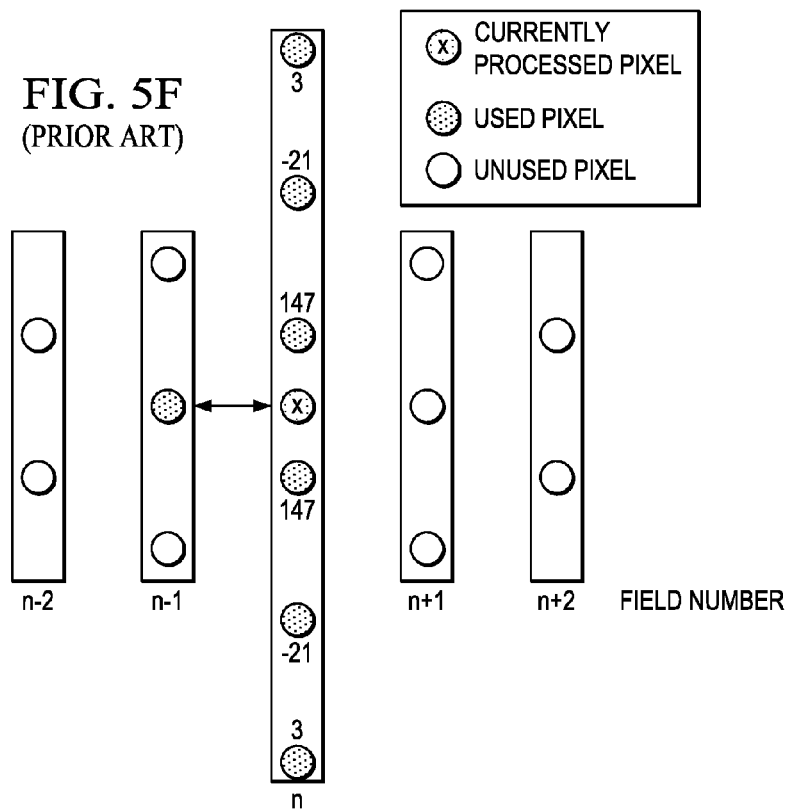
Figure 5G:
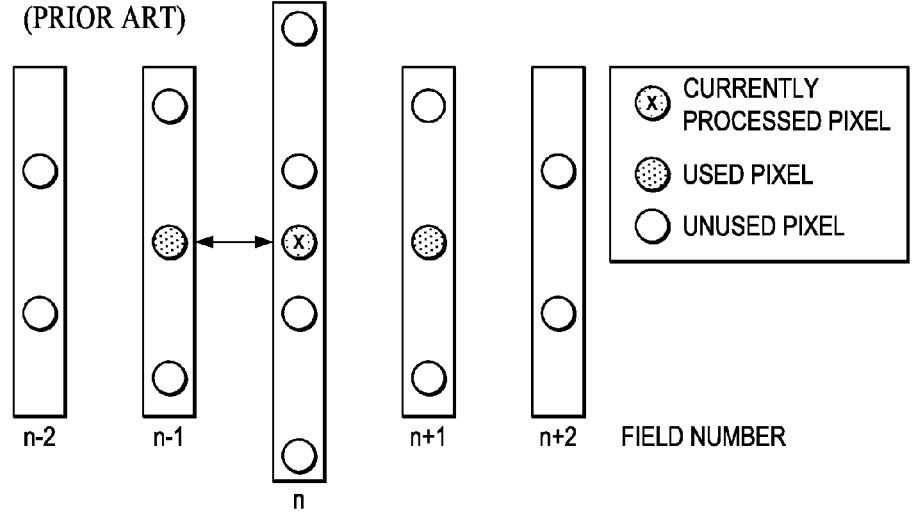
Figure 5H:
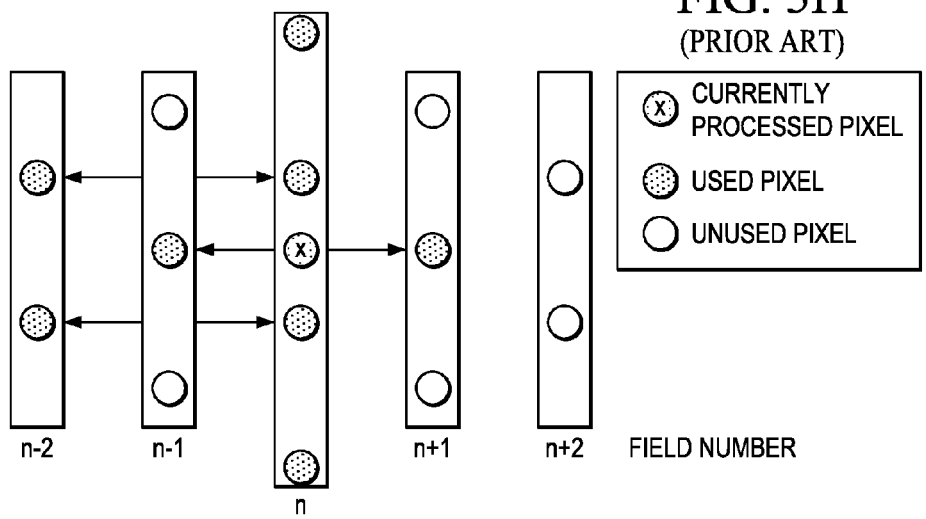
Figure 5I:
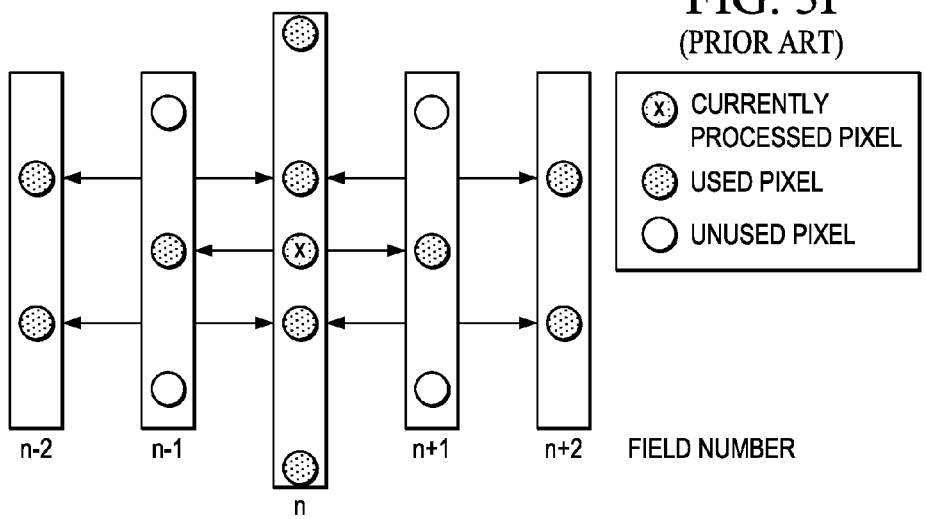
Figure 5J:
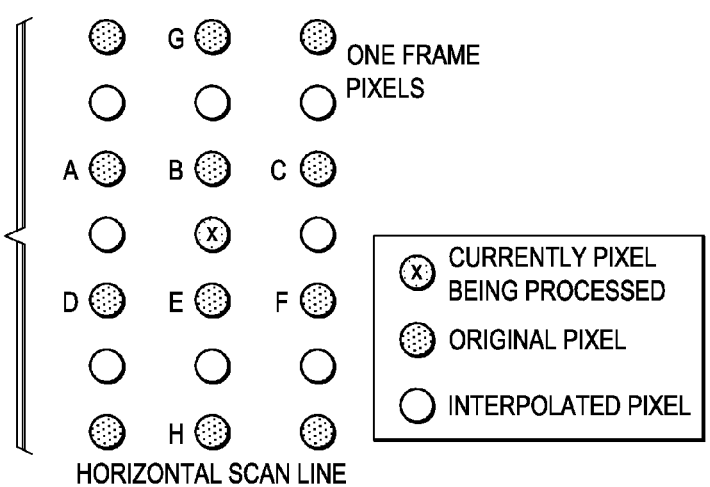

Generally speaking, it is desirable that the effect of previous fields' motion fades faster when the spatial-temporal frequency for one pixel's local area is low. For example, as shown in the sequence of FIG. 4, the player moves fast, which results in a great amount of motion detected for the background area that is covered by the player in the first picture and then re-appears in the following pictures. Due to the use of IIR filtering, the resulting high motion for this area will be propagated to the following fields, though background area itself does not move at all in the following fields. Due to the detected motion for this area, as previously discussed, spatial interpolation will be used which results in poor performance for this type of background area with relatively low contrast but busy. Thus, it is desirable that the fading speed of the IIR filtering be controlled by the spatial-temporal texture frequency, which denotes the amount of variance for the area that pixels from neighboring fields are virtually jammed together, which occurs when no motion is detected and thus pixels from the previous fields are jammed to the current field. The logic to calculate spatial-temporal texture frequency is set forth in detail later.

Additional control logic for the IIR filtering is usually needed for image scene changes. In this case, a great amount of motion will be detected, which, however, is not a meaningful motion indicator for the following fields and thus should not be propagated to the following fields. The IIR filtering must be reset at video scene changes, which are detected when the level of difference between two neighboring fields with the same parity is greater than a predefined threshold.

Figure 3:
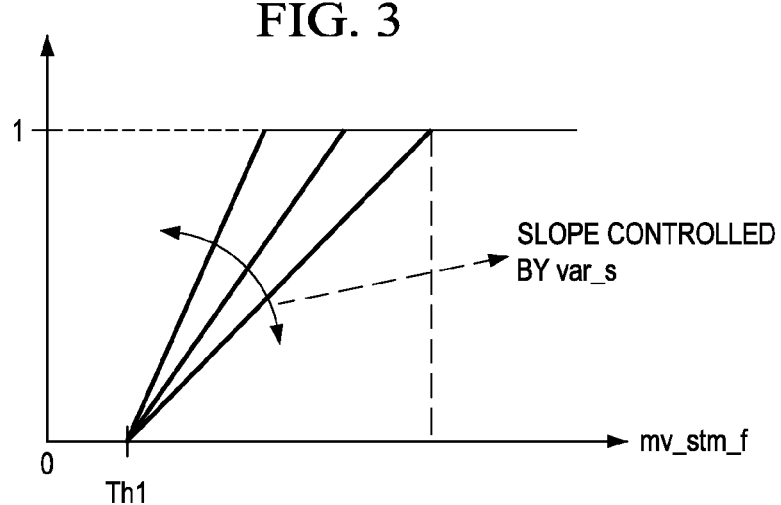
FIG. 3 is a graph of a blending function.

As shown in equation (1.2), mv_out needs to be transformed to (0 1), which is the coefficient used to fade (blend) between the spatial interpolated output and the temporal interpolated output, for de-interlacing. The transformation function is usually non-linear as shown in FIG. 3. In addition, as discussed in the cross-referenced patent application Ser. No. 11/550,100, it is usually preferred that the slope of the transformation is selected according to the spatial variance (uniformity) for the local area of the pixel being processed. It is desirable that the motion detection is more sensitive (the sensitivity is reflected in: the steeper the slope in FIG. 3, the more sensitive the final motion detection) with respect to the computed mv_stm_f when the spatial texture frequency is low, because it is more likely to introduce temporally interpolated artifacts (the artifacts are more observable) in de-interlacing as (1.2) shows. Thus, usual preferred embodiments provide more conservative motion detection or favor spatial interpolation in spatially flat areas. Herein we employ the same scheme to calculate the uniformity, var_s, which will be detailed in the following. However, differing from the cross-referenced application, where the slope is directly controlled by var_s as shown in FIG. 3, in the preferred embodiment methods, mv_out is a scaled version of mv_stm, and the scale factor is controlled by var_s. Then, mv_out (instead of mv_stm_f) is mapped to and the transform function is based on a look-up table. This structure is more flexible because users can upload their preferred transform function in the form of a look-up table.

The preferred embodiment motion detection system can be decomposed into the following components.

(1) Low-pass filtering (2) Motion calculation (3) Spatial maximum filtering (4) Spatial-temporal maximum filtering (5) Spatial texture frequency detection (6) Spatial-temporal texture frequency detection (7) Scene change detection (8) Texture-adaptive temporal IIR filtering (9) Texture-adaptive spatial-temporal maximum filtering We next explain each component in detail.

(1) Low-Pass Filtering

Figure 2B:
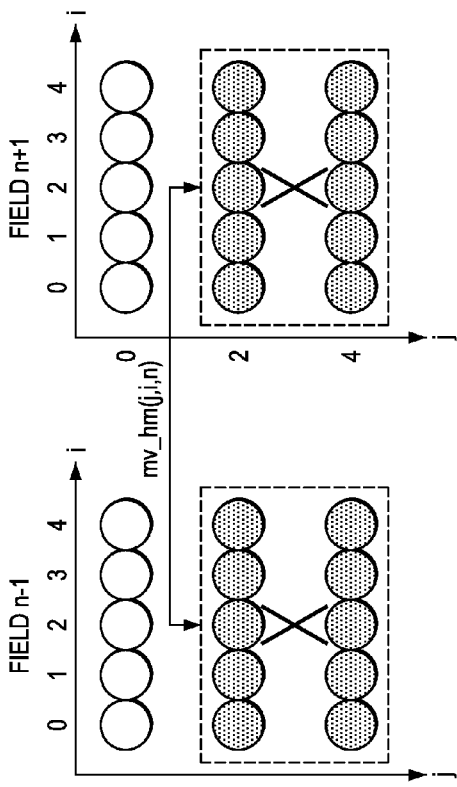
FIGS. 2A-2F illustrate pixels involved in steps.
Figure 2A:
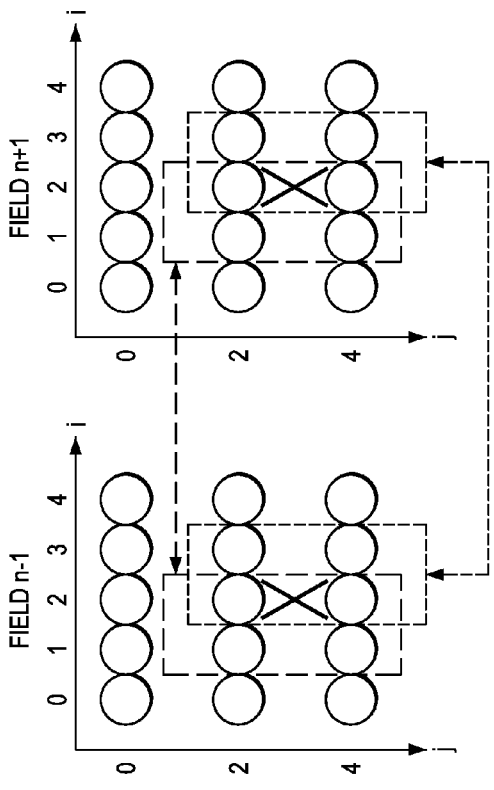

Although various types of low pass filters of the luma input can be used, we employ a very simple one as illustrated in FIG. 2A, where a 2×2 average filter given in (3.1) is used. Note that this preferred embodiment is not limited to the use of any particular realization of low pass filtering.

$$y_{lp}(j, i, n) = \frac{1}{4} \sum_{0 \leq m \leq 1, -1 \leq k \leq 0} y(j+m, i+k, n) \quad (3.1)$$

(2) Motion Calculation

A motion measure is calculated by taking the difference of the low-pass filtered luma $y_{lp}$, given by:

$$mv(j, i, n) = \frac{1}{2} \sum_{0 \leq k \leq 1} |y_{lp}(j, i+k, n-1) - y_{lp}(j, i+k, n+1)| \quad (3.2)$$

The pixel coverage is shown in FIG. 2A. Two shift versions of this motion measure are given below:

$$mv1(j, i, n) = \begin{cases} 15 & \text{when } [mv(j, i, n) >> 1] > 15 \\ mv(j, i, n) >> 1 & \text{otherwise} \end{cases} \quad (3.3)$$

$$mv3(j, i, n) = \begin{cases} 15 & \text{when } [mv(j, i, n) >> 3] > 15 \\ mv(j, i, n) >> 3 & \text{otherwise} \end{cases} \quad (3.4)$$

mv1(j,i,n) is obtained by right shifting mv(j,i,n) by 1 (i.e., divide by 2), and mv3(j,i,n) is obtained by right shifting mv(j,i,n) by 3 (i.e., divide by 8). mv1(j,i,n) can be used for the application of temporal noise reduction. mv3(j,i,n) is sent to the maximum filters discussed next.

(3) 1×3 Spatial Maximum Filtering

The 1×3 spatial maximum filtering of the motion measure is given by:

$$mv\_hm(j,i,n) = \max\{mv3(j,i+k,n)\}, -1 \le k \le 1 \quad (3.5)$$

The coverage of this maximum filter is illustrated in FIG. 2B.

(4) Spatial-Temporal Maximum Filtering

Figure 2C:
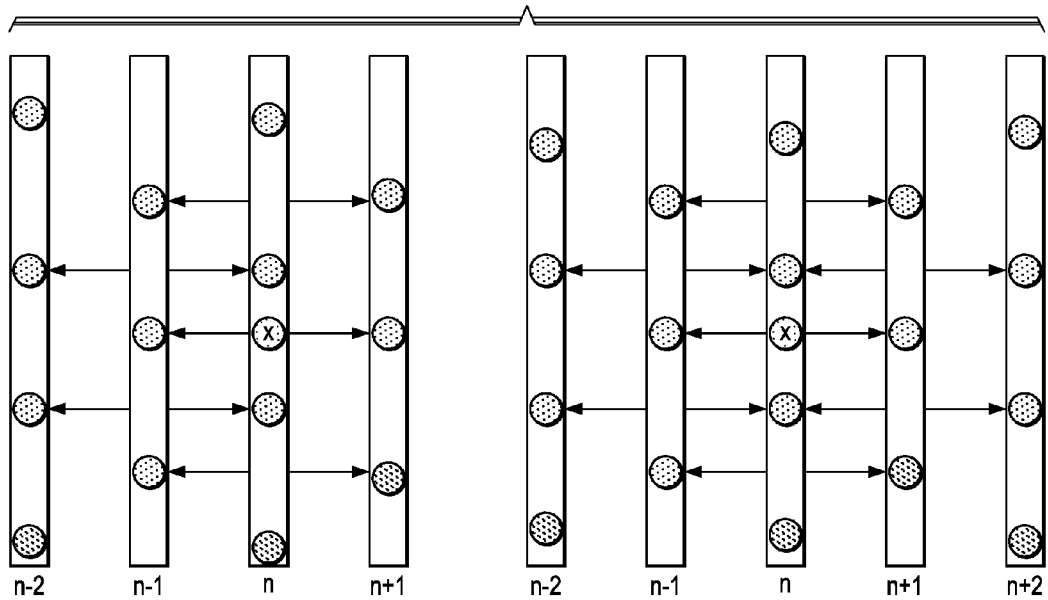

As described above, the preferred embodiment system supports both 4-field and 5-field spatial-temporal maximum filtering. Figure FIG. 2C illustrates the pixel coverage of the two approaches, where each column represents one field and one pixel (one line of pixels).

When 4-field spatial-temporal maximum filtering of the motion measure after spatial filtering is used, we have $$mv\_stm(j, i, n) = \quad (3.6)$$
$$\max\{mv\_hm(j, i, n), mv\_hm(j-1, i, n), mv\_hm(j-m, i, n-1)\}$$
$$m = \begin{cases} 0 & \text{if field } n \text{ is top field} \\ 1 & \text{if field } n \text{ is bottom field} \end{cases}$$

Figure 2D:
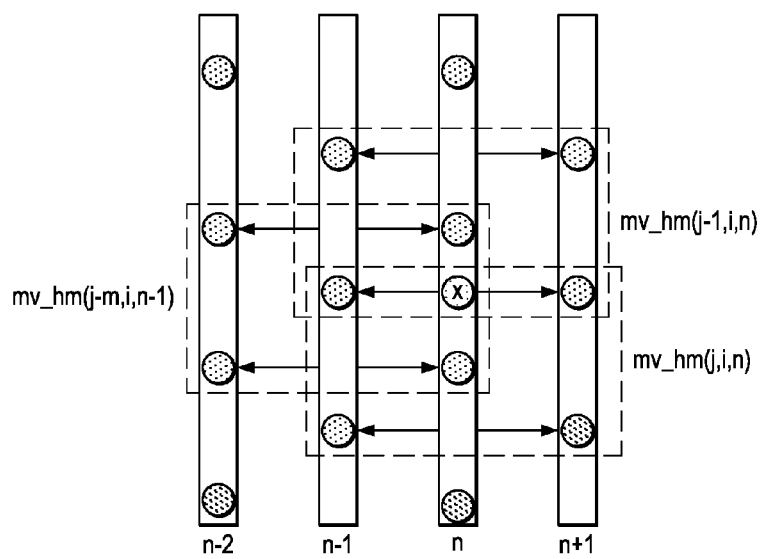

Note that each motion value component in the above maximum operation covers two lines of luma pixel differences, as clearly shown in FIG. 2D.

When the 5-field spatial-temporal maximum filtering of the motion measure after spatial filtering is used, we have $$mv\_stm(j, i, n) = \max\{mv\_hm(j-m, i, n-1), mv\_hm(j, i, n), \quad (3.7)$$
$$mv\_hm(j-1, i, n), mv\_hm(j-m, i, n-1)\}$$
$$m = \begin{cases} 0 & \text{if field } n \text{ is top field} \\ 1 & \text{if field } n \text{ is bottom field} \end{cases}$$

(5) Spatial Texture Frequency Detection

Spatial texture frequency detection calculates a measure of the local variance based on the sum of absolute differences. First we calculate the spatial variance of two neighboring fields, field n−1 and field n, as follows:

$$var\_pre(j, i, n-1) = \frac{1}{16} \sum_{\substack{-1 \le l \le 1 \\ -2 \le k \le 2}} |y(j+l, i+k, n-1) - y(j, i, n-1)| \quad (3.8)$$

$$var\_cur(j, i, n) = \frac{1}{16} \sum_{\substack{0 \le l \le 1 \\ -2 \le k \le 2}} |y(j-m+l, i+k, n) - y(j-m, i, n)|$$

$$m = \begin{cases} 0 & \text{If field } n \text{ is top field} \\ 1 & \text{If field } n \text{ is bottom field} \end{cases} \quad (3.9)$$

Figure 2E:
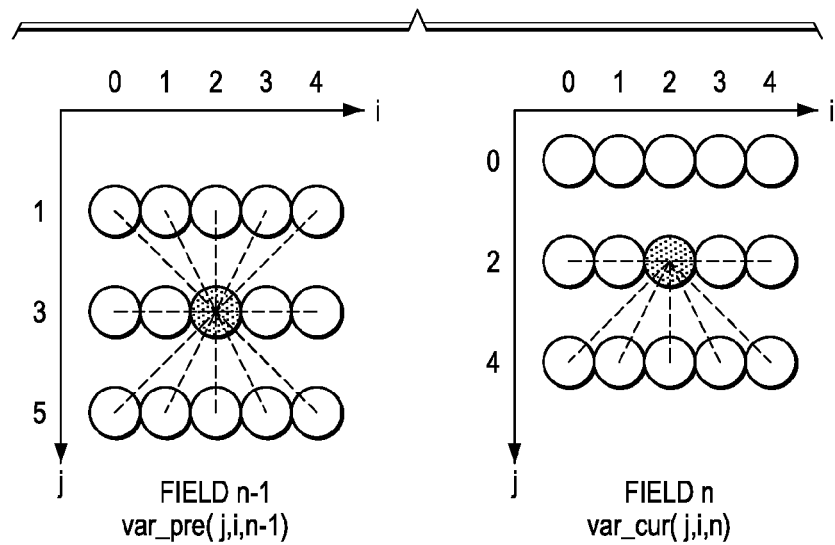

The calculations of the two values are illustrated in FIG. 2E. The spatial variance for pixel (j,i,n), var_s(j,i,n), is then given by $$var\_s(j,i,n) = \min\{var\_pre(j,i,n-1), 1.5 \times var\_cur(j,i,n)\} \quad (3.10)$$

The factor of 1.5 is used for fair comparison due to the different number of additions used for calculating var_cur and var_pre. The higher the value of var_s(j,i,n), the more local contrast around the pixel (j,i,n).

(6) Spatial-Temporal Texture Frequency Detection

Spatial-temporal texture frequency detection calculates the absolute difference between the pixel from the same position of the previous field and spatially (vertically in this case) interpolated pixel value for the current pixel as follows:

$$var\_st(j, i, n) = \quad (3.11)$$
$$\left| y(j, i, n-1) - \frac{1}{2}[y(j-m, i, n) + y(j-m+1, i, n)] \right|$$
$$m = \begin{cases} 0 & \text{if field } n \text{ is top field} \\ 1 & \text{if field } n \text{ is bottom field} \end{cases}$$

Figure 2F:
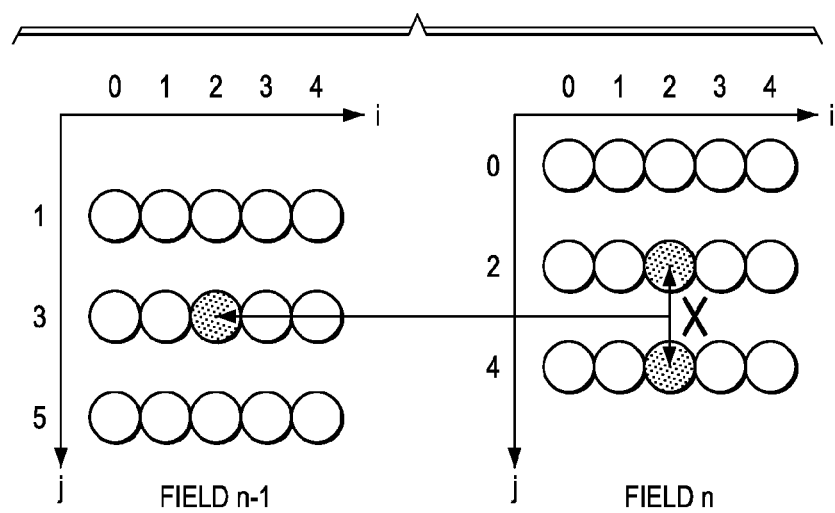

FIG. 2F illustrates the pixel coverage of this spatial-temporal variance.

(7) Scene Change Detection

The scene change detection calculates the field difference as follows:

$$mv\_cnt(n) = \sum_{i,j} mv3(j, i, n) \quad (3.12)$$

The decision logic is:

if(mv_cnt(n−2) − mv_cnt(n−1) > sc_th||mv_cnt(n−1) − mv_cnt(n) > sc_th)

scene_change = 1;

else scene_change = 0;

where sc_th is a predefined constant. When scene_change is 1, the IIR filter is reset.

(8) Texture-Adaptive Temporal IIR Filtering

Figure 1B:
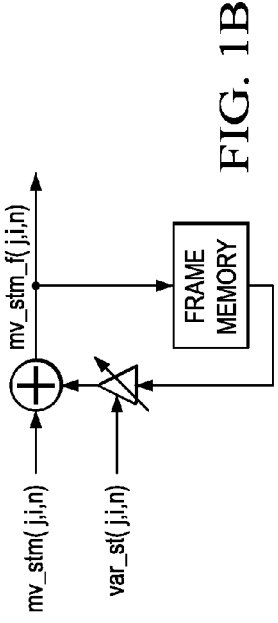

The block diagram of texture-adaptive temporal infinite impulse response (IIR) filtering is illustrated in FIG. 1B and is computed from the motion measure after the spatial-temporal maximum filtering:

$$mv\_stm\_f(j,i,n) = mv\_stm(j,i,n) - \lambda \cdot mv\_stm\_f(j,i,n-2) \quad (3.13)$$

where is feedback coefficient, which is controlled by the spatial-temporal variance var_st(,i,n) as follows:

if (var_st(j, i, n) var_st_th1)
    = 0;
  else if (var_st(j, i, n) var_st_th2)
    = 1/8;

-continued
```
    else if (var_st(j, i, n) var_st_th3)
        = 1/4;
    else
        = 1/2
```

The three constants var_st_th1, var_st_th2, and var_st_th3 (var_st_th1<var_st_th2<var_st_th3) are thresholds. For 8-bit luma data, examples of threshold values are: $\text{var\_st}_{th1}=16$, var_st_-th2=32, var_st_th3=48. Clearly, this is a low-pass filter. It is assumed that with decreasing local spatial-temporal luma variance, will decrease. As a consequence, the low-pass filter becomes smoother, allowing more high temporal frequency motion information to pass. With increasing local luma variance, the low-pass filter becomes sharper, blocking away more high temporal frequency motion information.

It can be interpreted in another way. The IIR filter here allows the motion values from the previous fields to be accumulated to the spatial-temporal maximum filtered motion values calculated for the current field. Note that the temporal maximum filter can only cover a limited number of fields, e.g., 4 fields or 5 fields in the above discussed scheme. The temporal IIR filter extends the temporal coverage of the calculation. Low temporal frequency information here is the motion values from the previous fields. Thus, this operation allows for adjusting the temporal coverage according to the spatial-temporal luma frequency of the local area.

(9) Texture-Adaptive Spatial-Temporal Maximum Filtering

Analogous to the cross-referenced application, we employ texture-adaptive spatial-temporal maximum filtering. The final spatial-temporal maximum filtering output mv_out(j,i,n) is a scaled version of mv_stm_f(j,i,n) according to the spatial texture frequency measure var_s(j,i,n) as follows:

```
    if (var_s(j, i, n) var_s_th1)
        mv_out(j, i, n) = 4 x mv_stm_f(j, i, n)
    else if (var_s(j, i, n) var_s_th2)
        mv_out(j, i, n) = 3 x mv_stm_f(j, i, n)
    else if (var_s(j, i, n) var_s_th3)
        mv_out(j, i, n) = 2 x mv_stm_f(j, i, n)
    else
        mv_out(j, i, n) = mv_stm_f(j, i, n)
```

The three constants var_s_th1, var_s_th2, and var_s_th3 (var_s_th1<var_s_th2<var_s_th3) are thresholds. The greater values of the three thresholds, the more sensitive the final motion output is with respect to the spatial texture frequency. For 8-bit luma data, examples of threshold values are: var_s_th1=4, var_s_th2=8, var_s_th3=12.

Lastly, mv_out determines the blending factor a in de-interlacing $$\hat{F}(x,y,n) = \alpha F_{mot}(x,y,n) + (1\alpha) F_{stat}(x,y,n)$$

by a lookup table. An example of a possible simple lookup table is:

| mv_out | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | 0 | 2/16 | 4/16 | 6/16 | 8/16 | 12/16 | 1 | 1 | 1 | 1 | 1 | 1 | 1 | 1 | 1 | 1 |

Implementation

Figure 1C:
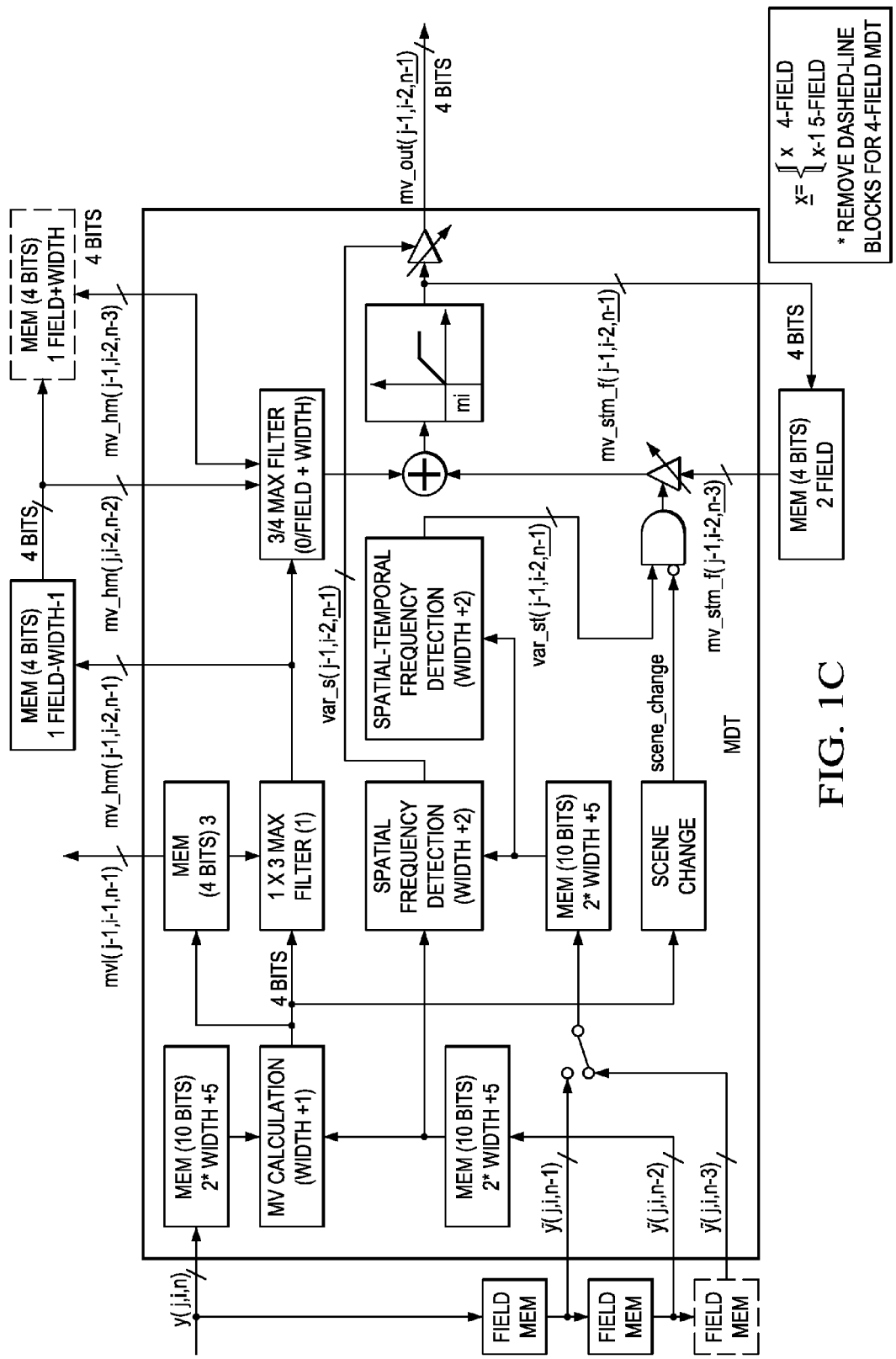
Figures 1, 1D:
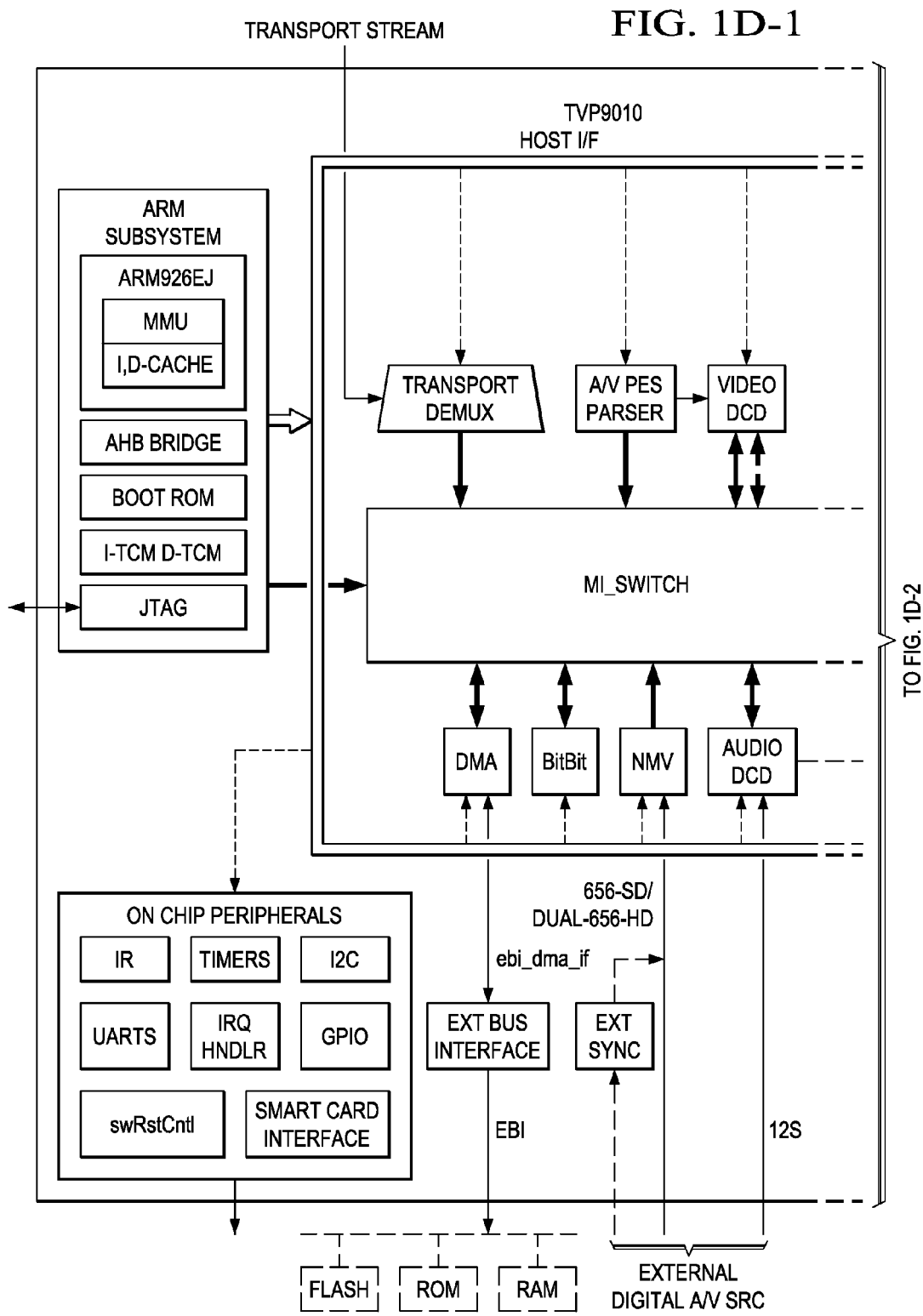
Figures 1, 1D, 2:
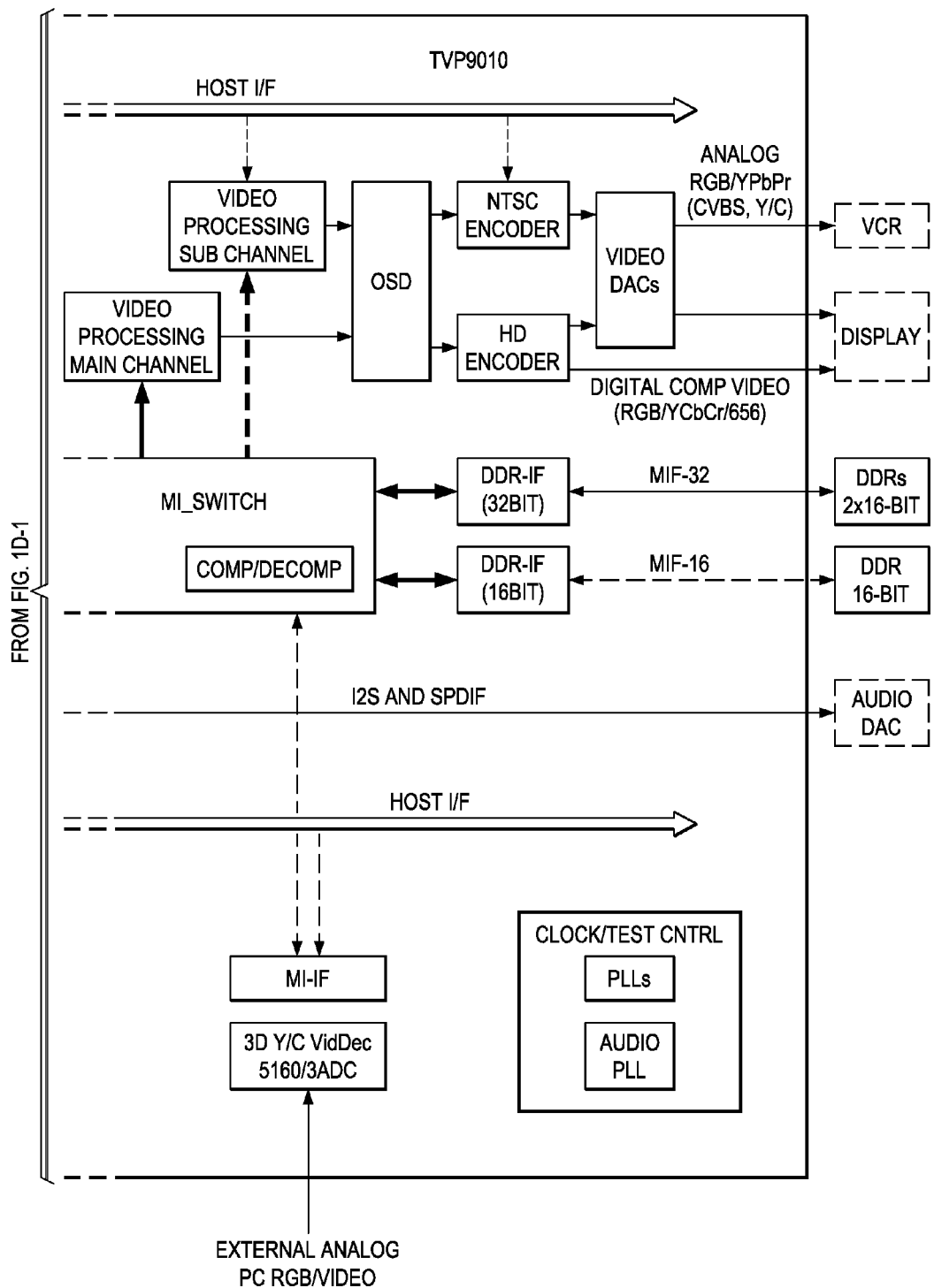
Figure 1E:
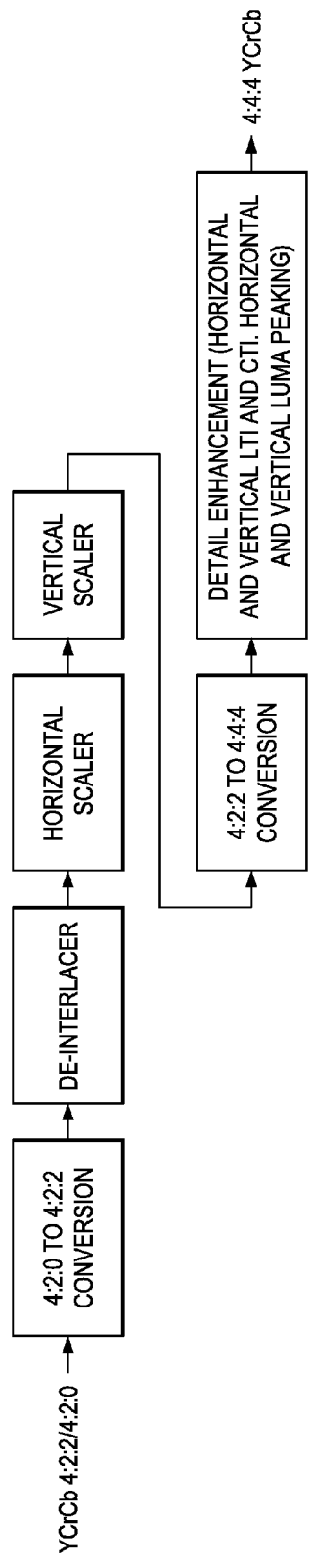

FIG. 1C shows one implementation. It is worth pointing out that the preferred embodiment herein is not limited to this specific implementation, which is just one realization of the scheme in FIG. 1A.

The input luma signal y(j,i,n) is 8-bit data and the motion values all have 4-bit-resolution. This implementation supports both 4-field and 5-field motion detection architectures. The dashed-line blocks are not needed when 4-field motion detection approach is used. In using 4-field scheme, the spatial-temporal maximum filter will be a 3-point maximum filter and 4-point maximum filter when 5-field scheme is used, as previously discussed. The current status of the switch in the figure is for 5-field architecture. When 4-field architecture is used, the switch needs to be switched to the other way.

The shaded blocks are for memories, and the numbers marked in those blocks represent the size of that memory. For example, the memory block marked by "4 bits" on the top and "2*width+5" in the bottom means that this memory stores "2*width+5" 4-bit values, where "width" is the number of pixels of each line in a picture. So this is a 2-line buffer plus 4 pixels. The number in parentheses of white blocks denotes the number of delays introduced by that block. For example, the motion calculation block has delay of "width+1", so the input luma index is (j,i,n) and then the output motion index is (j−1,i−1,n−1). The reason why the field index is decreased by 1 is because the motion index is associated with the middle field when the luma signals from the previous field and the following field are used to calculate the motion. Note that the field indexes for the 4-field and 5-field architectures are different. For easy notation, we use n to denote the field index, where n̄=n−1 and n̄=n in 4-field and 5-field architectures, respectively.

In summary, the preferred embodiment methods and architectures provide a general and flexible system of motion detection for interlaced video. The components of the system include texture-adaptive spatial-temporal maximum filtering and texture-adaptive IIR filtering for motion. The preferred embodiment system is flexible in that it can support different motion detection architectures (for example, the 4-field and 5 field architectures as shown in FIG. 1C), which have different hardware requirements, such as memory size and memory bandwidth. It also supports different applications that require accurate detection of motion between fields, including (1) interlaced-to-progressive video format conversion, (2) motion-adaptive temporal noise reduction, (3) video compression and (4) motion tracking. The preferred embodiments of the foregoing description focused on interlaced-to-progressive video format conversion applications. It is worth pointing out that this can be directly used as a component in the other applications without or with minor modifications.

Modifications

The preferred embodiments can be modified while retaining the motion detection output as a lookup table index from a motion level adjusted by the spatial variance. In particular, the various thresholds and multiplicative factors can be varied while maintaining the general structure.

What is claimed is:

1. A method of motion detection for interlaced fields, comprising the steps of:

(a) for a pixel (x,y) of parity differing from the parity of a first field, computing a first motion measure for said pixel (x,y) from differences between the values of pixels in a neighborhood of (x,y) in the field preceding said first field and the values of corresponding neighborhood pixels in the field following said first field;

(b) filtering said first motion measure for said pixel (x,y) to give a second motion measure for said pixel (x,y) wherein said filtering includes texture-adaptive spatial-temporal filtering and an infinite-impulse-response (IIR) filtering with filter coefficient adapting to a measure of spatial-temporal variance about said pixel (x,y) for capturing fast and periodic motion in interlaced video sequence, wherein the IIR filtering is reset at video scene changes when a level of difference between two neighboring fields with the same parity is greater than a threshold; and (c) computing an output motion measure for said pixel (x,y) from said second motion measure for said pixel (x,y).

2. The method of claim 1, wherein said filtering said first motion measure includes spatial maximum filtering prior to said IIR filtering.

3. The method of claim 1, wherein said filtering said first motion measure includes spatial-temporal maximum filtering prior to said IIR filtering.

4. The method of claim 1, wherein said filter coefficient adapting to a measure of spatial-temporal variance includes adapting to a scene change detection.

5. The method of claim 1, wherein said computing a first motion measure includes lowpass filtering prior to said differences.

6. The method of claim 1, wherein said computing an output motion measure uses a measure of spatial variance about said pixel (x,y).

7. A method of video de-interlacing, comprising the steps of:

(a) detecting motion for a pixel (x,y) of parity differing from the parity of a first field;

(b) computing a value for said pixel (x,y) as a blend of a spatial interpolation for said pixel (x,y) and a temporal interpolation for said pixel (x,y) where said blend depends upon said motion detection;

(c) wherein said detecting motion includes (i) computing a first motion measure for said pixel (x,y) from differences between the values of pixels in a neighborhood of (x,y) in the field preceding said first field and the values of corresponding pixels in the field following said first field; (ii) filtering said first motion measure for said pixel (x,y) to give a second motion measure for said pixel (x,y) wherein said filtering includes texture-adaptive spatial-temporal filtering and an infinite-impulse-response (IIR) filtering with filter coefficient adapting to a measure of spatial-temporal variance about said pixel (x,y) for capturing fast and periodic motion in interlaced video sequence, wherein the IIR filtering is reset at video scene changes when a level of difference between two neighboring fields with the same parity is greater than a threshold; and (iii) computing an output motion measure for said pixel (x,y) from said second motion measure for said pixel (x,y).

8. The method of claim 7, wherein said computing as a blend includes use of a lookup table indexed by said motion detection.

9. The method of claim 7, wherein said filtering said first motion measure includes spatial maximum filtering prior to said IIR filtering.

10. The method of claim 7, wherein said filtering said first motion measure includes spatial-temporal maximum filtering prior to said IIR filtering.

11. The method of claim 7, wherein said filter coefficient adapting to a measure of spatial-temporal variance includes adapting to a scene change detection.

12. The method of claim 7, wherein said computing a first motion measure includes lowpass filtering prior to said differences.

13. The method of claim 7, wherein said computing an output motion measure uses a measure of spatial variance about said pixel (x,y).

* * * * *